United States Patent
Fontius

(10) Patent No.: US 7,567,701 B2
(45) Date of Patent: Jul. 28, 2009

(54) INPUT SYSTEM FOR ORIENTATION IN A THREE-DIMENSIONAL VISUALIZATION AND METHOD FOR VISUALIZATION OF THREE-DIMENSIONAL DATA SETS

(75) Inventor: Joerg Ulrich Fontius, Neunkirchen A. Brand (DE)

(73) Assignee: Siemens Aktiengesellschaft, Munich (DE)

(*) Notice: Subject to any disclaimer, the term of this patent is extended or adjusted under 35 U.S.C. 154(b) by 882 days.

(21) Appl. No.: 10/727,467

(22) Filed: Dec. 4, 2003

(65) Prior Publication Data

US 2004/0145585 A1    Jul. 29, 2004

(30) Foreign Application Priority Data

Dec. 4, 2002    (DE) ................ 102 56 659

(51) Int. Cl.
*G06K 9/00* (2006.01)

(52) U.S. Cl. .............. 382/154; 345/157; 345/161; 345/164

(58) Field of Classification Search ........ 382/154; 345/157, 161, 164
See application file for complete search history.

(56) References Cited

U.S. PATENT DOCUMENTS 5,309,913 A    5/1994    Kormos et al.
6,006,126 A *  12/1999   Cosman ............... 600/426
6,169,537 B1 * 1/2001    Taft .................... 345/163
6,480,184 B1   11/2002   Price
6,806,864 B2   10/2004   Rahn et al.
2002/0060665 A1 * 5/2002 Sekiguchi et al. ...... 345/157
2003/0001869 A1 * 1/2003 Nissen ................. 345/672

FOREIGN PATENT DOCUMENTS

DE    44 47 103      11/1996
DE    199 58 443     4/2002
DE    101 10 260     9/2002

OTHER PUBLICATIONS

Patent Abstracts of Japan—Publication No. 63106825—Date of publication Nov. 5, 1988.
Patent Abstract 2001-366722.
Patent Abstract 1995-393922.
Lokalisierung Mobiler Geräte—Seminar Mobile Computing-SS 2001—Roger Zimmermann.

* cited by examiner

*Primary Examiner*—Matthew C Bella
*Assistant Examiner*—Mike Rahmjoo
(74) *Attorney, Agent, or Firm*—Schiff Hardin LLP

(57) ABSTRACT

In a display system to display a visualization of three-dimensional data sets on a monitor, by means of values input with the aid of an input system, a three-dimensional representation is manipulated, whereby the manipulation is limited to a portion of the visualization.

16 Claims, 9 Drawing Sheets

76

INPUT SYSTEM FOR ORIENTATION IN A THREE-DIMENSIONAL VISUALIZATION AND METHOD FOR VISUALIZATION OF THREE-DIMENSIONAL DATA SETS

BACKGROUND OF THE INVENTION

The invention concerns an input system for orientation in a visualization of three-dimensional data sets, as well as a method for visualization of data points of a three-dimensional data set; the invention also concerns a representation device to represent such a visualization; moreover, the invention concerns a method to operate an imaging medical examination device and a method for graphical positioning of a slice to be measured by means of an imaging medical examination device in a three-dimensional data set of a preparation measurement.

The acquisition, representation and processing of three-dimensional data sets becomes significantly more important with increasing computing capacity of modern computers, since now spatial data with high data density (i.e. high resolution) can also be acquired, displayed and processed. In modern imaging medical examination devices, the advance in the development of such devices goes directly hand in hand with the possibility of an adequate representation and evaluation of the medical data. This is, for example, the case with the large medical devices in computer tomography or magnetic resonance tomography, or in the field of ultrasound sonography. Thus, for example, the acquisition of high-resolution angiography data primarily makes possible precise medical procedures.

Until now, the representation of such three-dimensional data sets has occurred in various ways. On the one hand, two-dimensional slice images or cross-sections were shown on conventional monitors. The third dimension was indirectly shown by the possibility of the display ("riffle-throughs") of various slices. On the other hand, there is the possibility of the perspective representation, whereby this must be calculated from the three-dimensional data sets. A virtual 3D subject shown in such a manner can then be considered from various directions via a computer-controlled rotation, meaning via a change of the perspective origin. This type of 3D representation can be transmitted to projection systems.

Another type of representation is based on what are known as 3D glasses, which effect a three-dimensional image for the observer. A further development leads to a three-dimensional representation in what is known as cyberspace. Three-dimensional data are thereby imported into a data helmet with data glasses. A spatial effect is conveyed to the viewer that is close to reality due to the fact that the position of the observer (given by the position of the data helmet) is taken into account in the representation of the three-dimensional data set.

Volumetric monitors take up an exceptional amount of room. An example is the 3D monitor by the company Actuality Systems that generates a real three-dimensional image of a subject to be imaged. A two-dimensional calculated image is thereby project on a rotating plane, such that a three-dimensional image exists for an observer. The application potential of such 3D monitors is, for example, in the field of the display of data acquired with the aid of medical imaging devices, or in the field of the display of complex three-dimensional structures, for example molecules. Among other things, volumetric monitors exhibit two advantages. On the one hand, the images are visible from a large range surrounding the monitor, such that a plurality of observers can simultaneously view the represented subject. This is particularly advantageous for teaching purposes. On the other hand, a 3D monitor enables the observer to focus on arbitrary points of the subject and to respectively obtain a sharp image.

For the user, it is now decisive how user-friendly it is to access virtual perspective information or real three-dimensionally represented information. Of first importance is an input device with which a data point in a data set can be selected, second the possibility to manipulate the data point, and third as advantageous as possible a representation of the manipulated 3D data set.

SUMMARY OF THE INVENTION

It is an object of the invention to specify an input system for orientation in a three-dimensional visualization, a method for visualization of three-dimensional data sets, a representation system to represent a visualization of three-dimensional data sets, a method to operate an imaging medical examination device, and a method for graphical positioning of a slice to be measured by means of an imaging medical examination device in a three-dimensional data set of a preparation measurement, which improve the orientation within a three-dimensional data set as well as its processing and ability to be visualized.

In an input system and method for orientation in a visualization of a three-dimensional dataset, a reference point is selected, a direction is specified, and a distance value is set.

Following are explanations of a plurality of exemplary embodiments using FIGS. 1 through 14.

DESCRIPTION OF THE PREFERRED EMBODIMENTS

Figure 1:
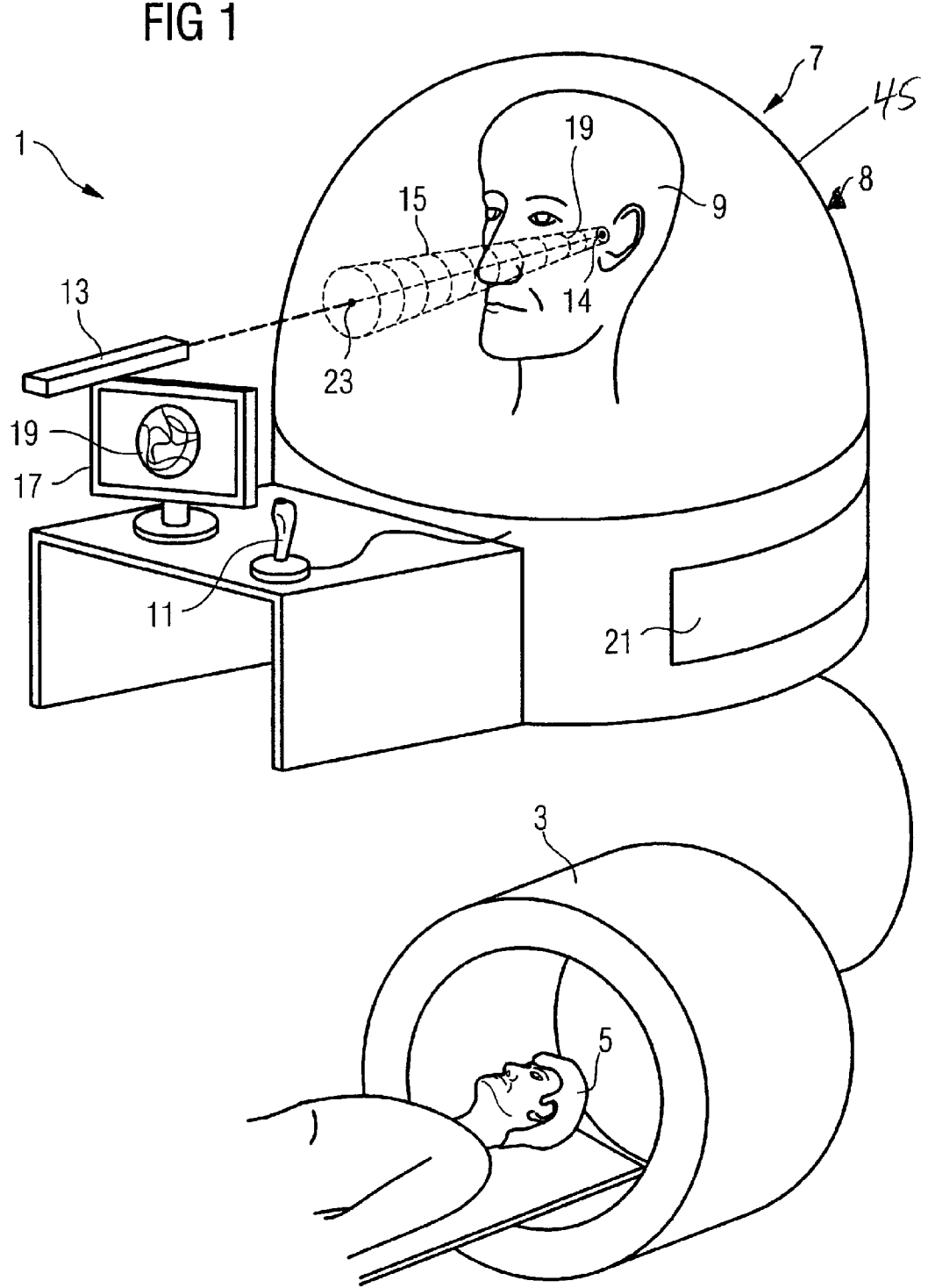
FIG. 1 is a display device to display a visualization of three-dimensional data sets.

For the purposes of promoting an understanding of the principles of the invention, reference will now be made to preferred embodiments illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates. An input device is provided for orientation in a visualization of three-dimensional data sets with a unit to select a reference point, with a unit to establish a direction, and with a unit to set a distance value. An input device enables an observer of the visualization to input orientation parameters (for example reference point, direction or distance value), whereby the input is preferably implemented by hand. If at all possible, an obstruction of the observation or of the movement freedom of the observer around the visualization may not occur. Such an input device on the one hand has the advantage that it offers the possibility to set orientation parameters according to a natural procedure: how far is a point of interest or region removed from which point in which direction. On the other hand, an input device offers a flexibility in the series with which the orientation parameters are set. For example, first the reference point can be established, then the direction, and finally the distance, or all orientation parameters can be set approximately simultaneously.

A method is disclosed to visualize data points of a three-dimensional data set. In this method, the data set is first shown on a monitor. A point in the display region of the monitor is then selected. For this, three orientation parameters are input with the preceding specified input device. On the one hand, a reference point is selected on a virtual surface whose geometric arrangement is known with respect to the display region of the monitor. On the other hand, a direction is set that, originating from the reference point, displays the point to be selected in the display region of the monitor. Furthermore, a distance value is set that establishes the distance of the point to be selected from the reference point. A region of the representation that stands in geometrically adjustable relation to the selected point is subsequently manipulated with regard to its representation manner.

Of importance in this method is the representation of the orientation parameter that can be set by means of the input device on the display region in which the visualization is shown. For example, a point on a plane is selected with the input device, whereby the surface is in direct contact with the input device. The surface is, for example, a base on which the input device is moved. Given the transfer of the point to the virtual surface, this should on the one hand be in relation to the display region of the monitor and on the other hand in relation to the observer. The first is required in order to be able to select the point from the virtual surface in the display region. The latter is determined by the three-dimensional representation and its observation, such as, for example, the observation angle. For example, given a perspective representation, it is advantageous to place the surface between subject and observer, and in the case of a volumetric monitor it is advantageous when the surface surrounds the monitor. Due to the unambiguous transfer of the one to the other, in the following a differentiation between the point that is set with the input device and the reference point on the virtual surface is only then effected in the event that it is necessary for understanding. An advantage of this method is likewise its imitation of the natural surroundings with real three-dimensional subjects.

A display device is disclosed to display a visualization of three-dimensional data sets according to the previously specified method for visualization of data points. The display device comprises an input device (likewise specified in the preceding) for orientation in a visualization, a visualization unit that generates a representation of the visualization by means of the orientation parameters input with the input device, and a monitor that displays the visualization. The advantage of this display device is that it enables an orientation within a visualization and its processing in an intuitive manner.

A method is disclosed to operate an imaging medical examination device using a previously specified method for visualization of data points. This method to operate an examination device has the advantage that, on the one hand, due to the improved representation, information can be more easily acquired from the medical examinations and used for diagnosis. On the other hand, this information can additionally be used in order to optimize further measurements with the imaging medical examination device, in that, for example, the region to be examined is more specifically narrowed.

A method is also disclosed for graphic positioning of a slice to be measured in a three-dimensional data set by means of an imaging medical examination device. This data set is acquired with lower resolution via a preparation measurement and displayed on a monitor. With the aid of the method specified above for visualization of data points, a data point is selected and the slice to be measured (which is defined by a geometric relation with regard to the data point) is specified. The slice preferably runs through the data point. The advantage is then that, with the aid of the input device, the orientation in the preparation measurement, and thus the selection of a slice to be examined, is made easier.

In an advantageous embodiment of the input device for orientation in a visualization, the means to select the reference point are designed such that they enable a positioning of the reference point on a two-dimensional surface and that they recognize the position on this surface. This has the advantage that the positioning of the reference point occurs in a two-dimensional surface and not in the three-dimensional space, assuming, however, that the two-dimensional surface is later set in spatial reference to the visualization.

In a special embodiment of the input device, the unit to select the reference point is a conventional mouse, whose movement, for example, is registered on a surface in two dimensions. The mouse is preferably connected with a computer to which it transmits acquired data. This embodiment has the advantage that it can resort to known technologies.

In a particular embodiment of the input device, the unit to establish the direction comprises a tiltable level, as well as a sensor that registers the tilting of the level in the direction. Such a level can be a tiltable joystick, whereby the tilting is, for example, monitored via the establishment of the tilted angle or via the duration of the tipping event and is converted into an angle. Starting from the position of the reference point on the two-dimensional surface, two angles in two different directions are sufficient to unambiguously establish a direction in space.

In a particular embodiment of the input device, the joystick is structurally connected with the mouse, in order to form a multifunction mouse. This has the advantage that two input devices required by a user are combined.

In a further advantageous embodiment of the input device, the input device comprises a pointer wand that is preferably freely movable, for example it comprises no connection cable to possible necessary units. This pointer wand is both a means to select the reference point and a means to establish the direction. To use the pointer wand as an input device, means are required that both determine the position of the pointer wand in space and its orientation in space. The position and the orientation can subsequently be set with regard to the visualization in order to establish the reference point and the direction.

In a particularly advantageous embodiment of the input device, the determination of the position and the orientation of the pointer wand occurs by means of ultrasonic elapsed-time measurements. The advantage of ultrasonic elapsed-time measurements is that the resolution, in this case the spatial resolution, can be set fine enough to unambiguously determine position and direction.

In a development the pointer wand comprises at least two ultrasonic transmitters that are preferably arranged at the ends of the pointer wand. Signals emitted by the ultrasonic transmitters are registered by receiving units of the input device. If the positions of the receiving units are known with regard to the visualization, and if the ultrasonic transmitters and the receiving units are temporally synchronized (for example via a radio connection) with a unit for synchronization, position and orientation of the pointer wand can be calculated from the elapsed times between ultrasonic transmitters and receiving units. The advantage of this development is that it uses a simple and known form of ultrasonic elapsed-time measurement.

In another development, the pointer wand comprises at least two ultrasonic reflectors that are likewise preferably arranged at the ends of the pointer wand. Ultrasonic transmitters, whose positions are known, emit signals that are reflected from the reflectors with varying strength and with characteristic pulse form. The thusly coded reflected ultrasonic signals are acquired by receiving units (whose position is likewise known with regard to the visualization) and associated with the respective ultrasonic reflector by means of a comparison of the signals with the known reflection patterns. The advantage of this development is in the passive functionality of the pointer wand that acts only as an ultrasonic reflector, such that less complicated electronics have to be housed in to the pointer wand.

In a further advantageous embodiment of the input device, the unit to set the distance value comprises a rotatable small wheel and a sensor to detect the rotation. The advantage of such a small wheel is that it can housed without problems in both the pointer wand and the multi-function mouse. The signals generated by a rotation of the pointer wand are, for example, transmitted via radio to a processing unit.

In a further advantageous embodiment, the input device additionally comprises a button to actuate a signal. One or more such buttons can generate control signals that are transmitted to a computer. The advantage of such buttons is that they are advantageous to operate and can be integrated simply into the pointer wand or the multi-function mouse.

In a further advantageous embodiment, the input device comprises an additional unit to output the reference point, the direction and the distance value. These means for output can, for example, by housed in a central computer that, for example, also comprises and controls the synchronization unit and/or the receiving units. The unit for output can be connectable with the 3D display systems specified above.

In an advantageous embodiment of the method for visualization of data points, these are shown on a 3D monitor. If, for example, such a monitor comprises a hemispherical display region, the virtual surface on which the reference point is projected is preferably likewise hemispherically placed around the display region.

In another embodiment of the method for visualization, the subject is perspectively shown on a 2D monitor. The monitor screen surface is preferably selected as a virtual surface on which the reference point is selected with the unit to select the reference point.

In this embodiment, and in the preceding embodiment of the method, the geometric arrangement of the virtual surface is known with regard to the display region. In a development, two angles are input with the input device for direction specification. These angles are placed at the location of the reference point and determine the direction in the display region in which the point to be selected lies. The sides or legs of the angle preferably lie in planes perpendicular, not parallel, to the tangential plane, whereby the tangential place is tangent to the virtual hemisphere or the monitor screen surface at the location of the reference point. Alternatively, the sides or legs of the angles can lie in the tangential plane.

In a particularly advantageous embodiment of the method for visualization, the virtual surface is divided with a first coordinate system, for example into degrees of longitude and latitude. If the selection of the reference point occurs in a second coordinate system, the transfer of the reference point determined with the unit to select the reference point can occur on the virtual surface via a transfer from the first coordinate system into the second coordinate system.

In an advantageous embodiment of the method for visualization, during the setting of the orientation parameters, an arrow is continuously indicated at the respective data point currently determined by the orientation parameters, whereby the point of the arrow lies on the data point and the body of the arrow shows the direction of the reference point.

In an embodiment, the arrow is plotted as long as the orientation parameters are varied. The orientation parameters are first set by pressing a button of the input device, and the manipulation of the representation occurs.

In a particularly advantageous embodiment of the method for visualization, a region whose volume and/or shape is either preset or variable is also selected at the same time via the selection of the reference point. This has the advantage that not only a point, but rather a region determined by the point can be manipulated that can be adapted depending on requirements.

In an advantageous development, a region that lies between a reference point and a selected point is manipulated, whereby the region to be manipulated conically tapers on the selected point. The region continually moves with a change of the selected point. This has the advantage that the view of an observer can be manipulated along the cone on the selected point in order to prevent, for example, an obstruction of the view of the selected region.

In a particular embodiment of the method for visualization, the displayed three-dimensional data sets and/or the selected region can be shown in various manners, for example skeletally, opaque, transparent or semi-transparent. An opaque display, for example, shows only the surface of a three-dimensional subject. In a skeletal display, only specific data points are shown opaque; thus, for example in angiography, the blood vessels or the surfaces of the blood vessels are shown latticed or grid-like in their integration or networking. In a transparent or semi-transparent display of a data point, this is not visible, it does not completely cover data points placed behind others.

Given the semi-transparent display, the degrees of transparency are associated with data points that influence the display of the respective data point. For example, the translucency of the background data points (meaning the data points that are located behind a data point in the viewing direction) is controlled. This can be effected given special volumetric 3D monitors via the intensity of the display of the respective data point. In this manner, translucency effects can be generated. The association of a degree of transparency occurs, for example, from a frequency distribution of the data points over the signal intensity. A manipulation of the data points dependent on the signal intensity enables, for example, the data points outside of an intensity interval to be able to appear transparent. In this manner, an unnecessary intensity range can be suppressed in a visualization.

In another advantageous embodiment of the method for visualization, the region to be selected has a geometric shape, meaning a sphere or a cuboid. Via a cone (whose content is shown transparent in this case), an observer can initially, for example, position the cuboid and subsequently look into the cuboid, whereby the content of the cuboid is, for example, shown skeletally. Alternatively, the content of the cuboid and the side face bordering on the cone are shown transparent. The remaining side faces of the cuboid form correspondingly positioning slice images through the 3D subject, This has the advantage that, for example, endoscopic procedures can be simulated.

In an advantageous embodiment of the method, a slice place is placed through the selected point, whereby the data points are shown transparent on one side of the slice plane and opaque on the other side. This corresponds to the traditional 3D representation of a slice image.

In another embodiment of the method for visualization, in addition to a three-dimensional representation a two-dimensional representation is generated on a 2D monitor. In addition to the two-dimensional representation of a slice image, the position of the slice image in the three-dimensional representation is, for example, indicated in the form of a frame. This enables a clear orientation and positioning of the slice image in the 3D representation, as well as a high-resolution representation of the slice on the 2D monitor.

In a further advantageous embodiment of the method for visualization, the selected region is determined in that the points are selected whose value of a characteristic value lies in a window region around the value of the selected point. The characteristic value is, for example, the signal intensity of the selected point. This embodiment has the advantage that a skeletal representation of points with a similar value of the characteristic value is obtained.

In a particularly advantageous embodiment of the display device to display a visualization of three-dimensional data sets, the visualization unit comprises a unit that sets the reference point, the direction and the distance with regard to a virtual surface. The unit can thereby comprise a computer that calculates with a calculation program the geometric relations between the orientation parameters, the virtual surface and the volume that can be represented.

In a further embodiment of the method for graphical positioning, after the slice has been selected and positioned using the preliminary measurement, a high-resolution measurement is implemented with an imaging medical examination device and is shown on the monitor.

FIG. 1 shows a display device 1 to display a visualization of three-dimensional data sets. The data sets are acquired with the aid of a magnetic resonance tomography device 3 representative of imaging medical devices. The (in this case, three-dimensional) acquired head 5 of a patient is shown with the aid of a 3D monitor 7. The 3D monitor 7 is, in this case, a real 3D monitor that displays a subject (here the head 5) within its spatial display volume or region 8 defined by surface 45 as a spatial visualization image (such as by use of the commercially available 3D volumetric monitor by the company Actuality Systems described earlier) in 3D space (here a head image 9) with the surface 45 being outwardly spaced from the visualization image 9. Alternatively, the 3D monitor 7 could also be a conventional monitor, meaning a monitor with a two-dimensional display space that images the head using a spatial perspective.

With the aid of input devices or systems 11, 13 (for example a multi-function mouse 11 or a pointer wand 13), an orientation is possible within the display volume or region 8, and with it within the three-dimensional visualization (meaning in the head image 9). For this, required parameters are, for example, digitized and output per cable or infrared interface to the unit calculating and generating the visualization image.

If, for example, a point 14 in the head image 9 has been selected with the aid of the input devices or systems 11, 13, (for example) a virtual slice plane surrounding the point 14 can thus be considered along a transparent cone. Additionally, the slice plane can be imaged on a conventional 2D monitor 17, In FIG. 1, for example, a slice image 19 through a balancing organ of the head 5 is imaged.

With the aid of the input devices 11, 13, the observer can align the cone 15 to any position in the image volume of the 3D monitor 7, meaning every point 14 in the display volume 8 can be considered from every direction.

The 3D monitor 7 of the display device 1 additionally comprises a calculating unit 21 that, with regard to a virtual surface whose geometric arrangement with regard to the display volume 8 is known, sets the respective reference point 23 input with the input device, the direction, and the distance. The calculating unit 21 additionally comprises a unit that combines and calculates (with efficient calculation time) the geometric relationships between the 3D data and the input parameters of the input devices 11, 13. In other words, the calculating unit associates a point on the virtual surface with the input reference point 23, from which (starting along the input direction at the input distance) the point 14 or the region surrounding it is selected in the three-dimensional data set. The calculations are, for example, implemented as fast as possible by processors optimized for graphical relationships.

Figure 2:
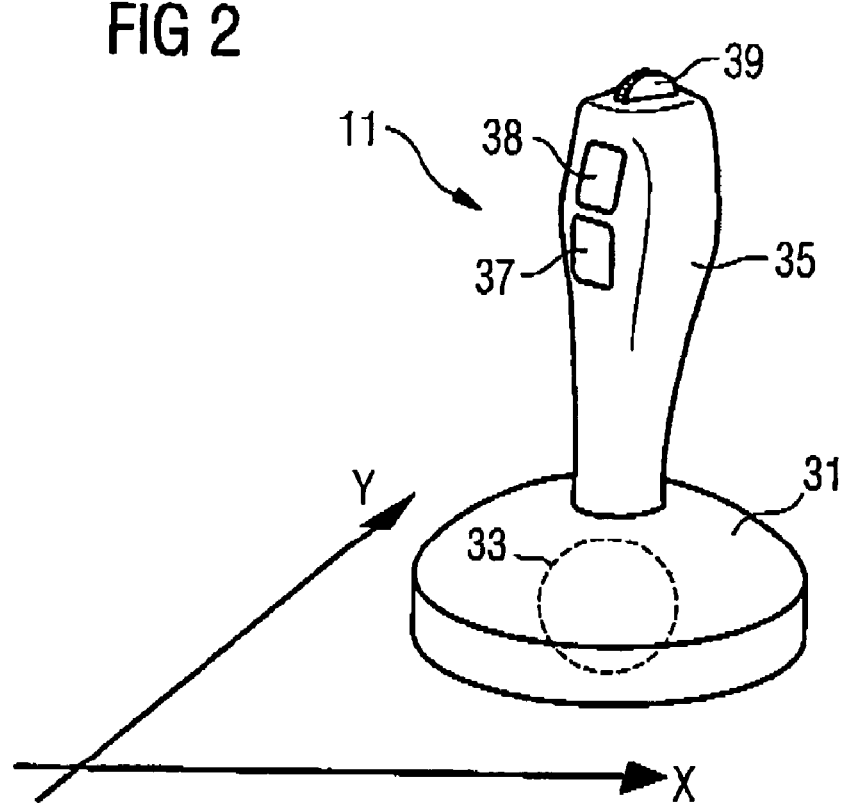
FIG. 2 is a multi-function mouse with a plurality of functional units.

FIG. 2 shows a multi-function mouse 11 with a plurality of different functional units. The base of the multi-function mouse 11 is a base frame 31 whose functionality corresponds to a conventional PC mouse. By means of a ball 33, the movement on a base is measured in two directions that are designated in FIG. 2 as the X-direction or the Y-direction. A movement of the multi-function mouse 11 on the base leads to a change in the X- and Y-coordinates which is registered and transferred, by means of the calculation unit 21, into a movement in a coordinate system of a virtual surface. Alternatively, the movement of the multi-function mouse 11 is optically detectable on the base (optical mouse).

In the example of the 3D monitor from FIG. 1, the virtual surface is, for example, represented by the semispherical surface of the display volume 8 which, for example, can be divided into degrees of longitude and latitude. For example, a movement of the base frame 31 along the X-direction corresponds to a movement on the latitude, and a movement along the Y-direction corresponds to a movement on the longitude.

An alternative to the base frame 31 in the manner of a mouse is a trackball or track pad system. In this case, a change of the coordinates is registered by a rotation of the ball or by a contact with the track pad.

A joystick 35 is affixed to the base frame 31 that allows it to register a movement in two (for example) orthogonal directions. The movement In a direction can, for example, determine the degree of the movement or, via the duration of the movement, an angle. With the aid of the calculation unit 21, an angle input in this manner is converted into an angle that sets a direction that is shown from the virtual surface, starting from the reference point. A tilt of the joystick 35 forwards or backwards corresponds, for example, (again with regard to FIG. 1) to an angular change in the longitudinal plane of the reference point, and a lateral tilt corresponds to an angular change in a plane that is perpendicular to the latitudinal plane and perpendicular to the tangential plane at the semispherical surface 45 of the display volume 8 at the reference point, whereby all planes go through the reference point.

The multi-function mouse 11 additionally possesses three buttons 37, 38, 39 that, in their operation and functionality, resemble the left, right and middle mouse buttons of a conventional mouse. With these buttons, additional inputs can be made in order to, for example, fix the angle or the reference point or to start with an output value. The middle mouse button 39 is additionally designed as a small wheel whose rotation is registered and is converted by the calculation unit 21 into a distance value, for example the length of an arrow starting from the reference point 23.

Figure 3:
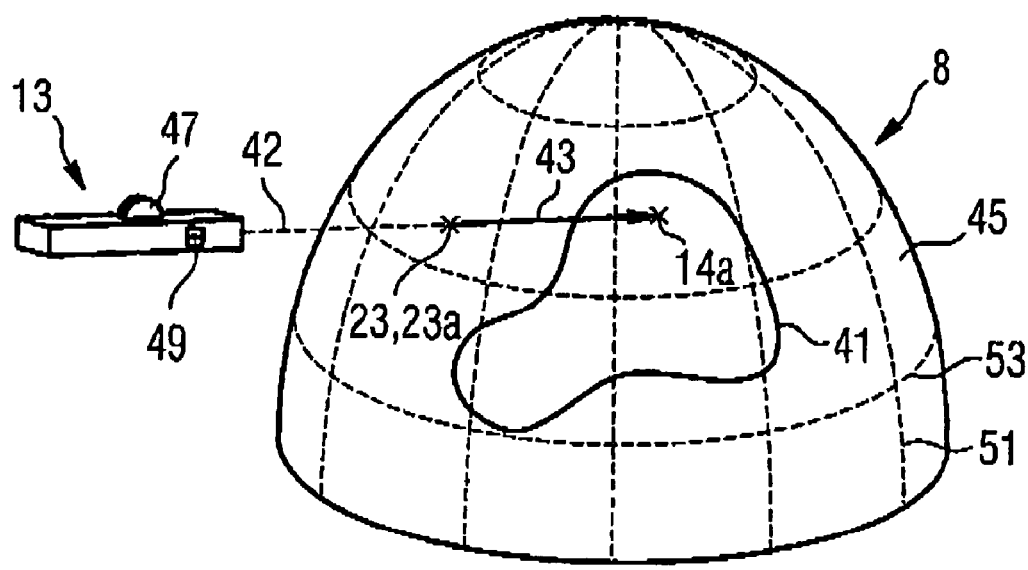
FIG. 3 a drawing that clarifies the use of a pointer wand.

FIG. 3 clarifies the use of the pointer wand 13 in the selection of a point 14a in the display volume 8. Due to the free movability of the pointer wand 13, the user has the possibility to show each desired position in an arbitrary range within the display volume 8. In FIG. 3, the user indicates the 3D subject 41 with the pointer wand 13. During the use of the pointer wand 13, its position and its orientation in relation to the surface 45 of display volume 8 are measured. The calculation unit 21 of the display device 1 calculates with these values a straight line 42 that runs along the intended extension of the pointer wand 13.

In order to be able to plot an arrow 43 in the display volume 8, the calculation unit 21 calculates the intersection point 23a if the straight line 42 with the surface 45 of the display volume 8. The intersection point 23a corresponds to the reference point 23 that is input with the preferred embodiment. The virtual surface on which the reference point 23 is positioned is, in this case, formed by the surface 45 of the display volume 8. If, with the aid of a small wheel 47 in the pointer wand 13, a distance value is additionally input this determines the distance of the point 14a to be selected from the intersection point 23 along the straight line 42. Alternatively, the distance can be set by a translation movement of the pointer wand 13 along the straight line 42, in that the translation movement is registered during the pressing of a button 49.

If the point 14a is determined in this manner in the 3D subject, the arrow 43 is plotted along the straight line 42, whereby the arrow tip shows the point 14a to be selected. The arrow 44 moves continually with a change of the point 14a, which is caused by a movement of the pointer wand 13. The display of a region around the point 14a in the 3D subject can also be changed by the selection of the point 14a. The region to be changed is preferably preset or, for example, is determined by means of the input device 11, 13.

With the aid of buttons 49 that are affixed to the pointer wand 13, an influence can be exerted on the course of the selection process and the representation of the 3D subject 41 in the display volume 8. Thus with them, for example, various representations can be switched between.

In order to suppress interferences in the display and in the selection process due to a tremor in the handling of the pointer wand 13, the calculation of the reference point 23 is slowed down, such that position changes of the reference point 23 on the surface 45 only occur delayed and/or damped fashion. Furthermore, for example with the aid of one of the buttons 49, the reference point 23 can be fixed in its position, such that only the orientation of the pointer wand 13 must still be monitored and measured in order to calculate the direction of the straight lines, and therewith of the arrow 43.

To accelerate the calculations, the calculation unit 21 could, for example, partition the surface 45 of the display volume 8 into a coordinate system with degrees of longitude and latitude 51, 53.

Figure 4:
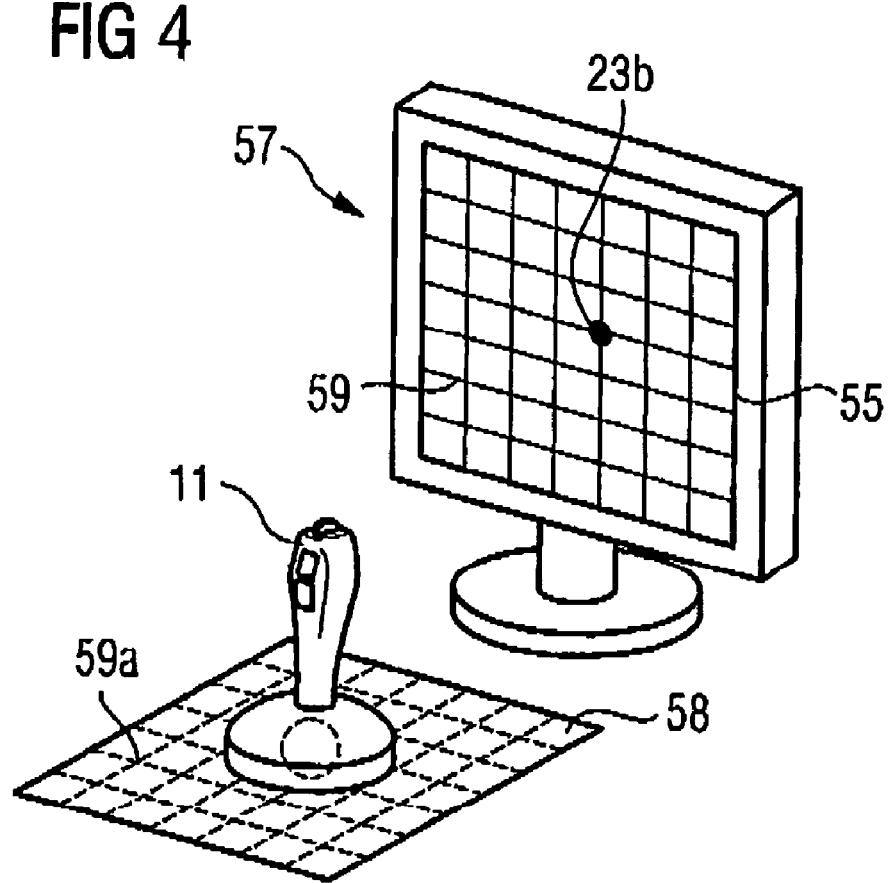
FIG. 4 is an example for the selection of a virtual surface given the use of a perspective 3D representation with a 2D monitor.

FIG. 4 shows an example for the selection of the virtual surface 55 given the use of a perspective 3D representation on a flat screen 57. The virtual surface 55 is thereby located on the screen surface, such that it is always located between observer and representation. The surface scanned with the multifunction mouse 11, for example a mouse pad 58, can be transferred with a scaling to the virtual surface 55. A scaling is particularly simple when, for both surfaces (meaning for the mouse pad 58 and for the virtual surface 55), Cartesian coordinates 59, 59a are used for position determination of the multi-function mouse 11 and reference point 23b.

Figure 5:
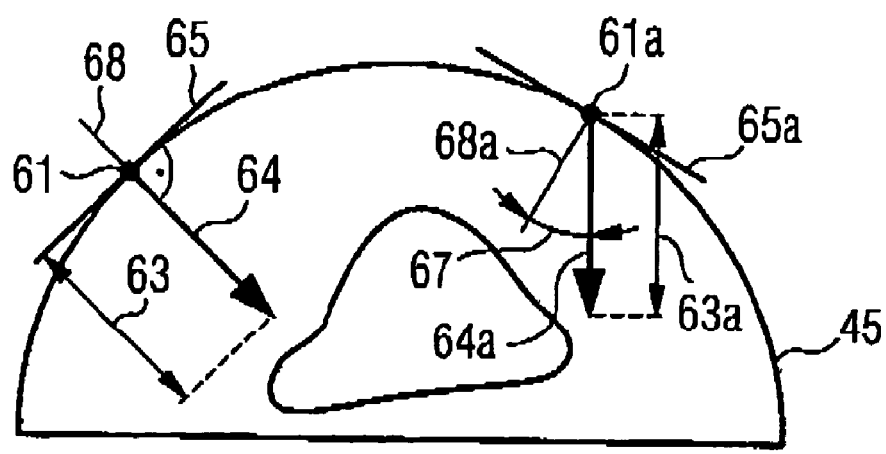
FIG. 5 is a drawing to clarify orientation parameters that can be input by means of input devices.

FIG. 5 clarifies the orientation parameters that can be input by means of the input devices 11, 13. FIG. 5 thereby shows two examples in which the angle inputs to determine the direction occur not in the longitudinal and latitudinal planes, but rather in which the angle inputs refer to or correspond to the deviation from the normal of the tangential plane through the reference point. In the examples, the reference points 61, 61a were input with the aid of the input devices 11, 13. They lie at various positions on the surface 45 of the display volume 8. Furthermore, the distance values 63, 63a in FIG. 5 are plotted that determine the distance from the reference point 61, 61a to the points to be selected, which lie at the tips of the arrows 64, 64a. Additionally, in FIG. 5 tangential planes 65, 65a are shown on the surface 45 through the respective reference points 61, 61a. In the first example of FIG. 5, the arrow 64 lies in a plane that is perpendicular to the tangential plane 65. In this case, no angular deviation was input, at least for a direction. In the second example, with the aid of joystick 35 or the orientation of the pointer wand 13, an angle 67 was input that determines the deviation of the direction of the arrow 64a from a normal 68a on the tangential plane 65a in a direction.

Figure 6:
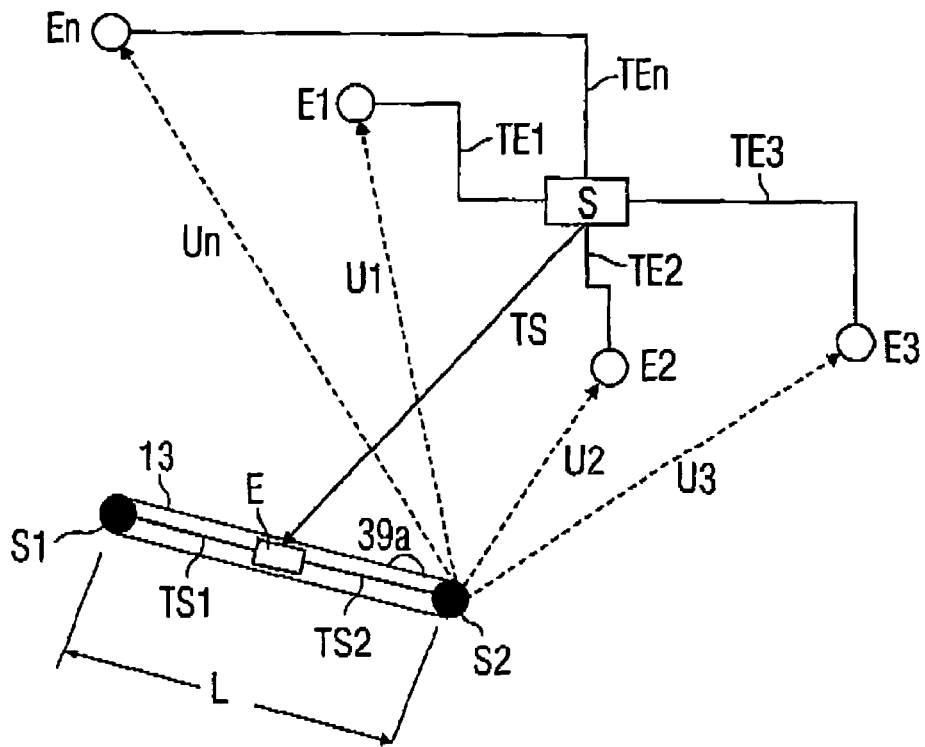
FIG. 6 is a first measurement arrangement that allows the determination of the position and arrangement of a pointer wand.

FIG. 6 shows the measurement arrangement that allows the determination of the position and orientation of the pointer wand 13. Two ultrasonic transmitters S1, S2 are located in the pointer wand 13. Both transmitters alternately emit an ultrasonic pulse that is received by at least three receivers E1, E2, E3, En according to determined elapsed times U1, U2, U3, Un. The distances between the ultrasonic transmitters S1, S2 and the receivers E1, E2, E3, En can be calculated from the elapsed times U1, U2, U3, Un with the aid of the speed of sound. The locations of the transmitters S1 and S2 can be determined from the distances and the known positions of the receivers E1, E2, E3, En. The position of the pointer wand 13 and its orientation are thus unambiguously defined in space, and can easily be set with regard to the display volume 8.

With the aid of the calculation unit 21, the intended extension of the pointer wand can be calculated and plotted in the display volume 8.

To determine the elapsed times U1, U2, U3, Un, the transmitters S1, S2 must be synchronized with the receivers E1, E2, E3, En. This occurs with a synchronization unit S and the synchronization paths TE1, TE2, TE3, TEn, TS, TS1, TS2 belonging thereto that connect the synchronization unit S, for example a radio transmitter, with the receivers E1, E2, E3, En and the transmitters S1, S2 in the pointer wand 13. Additionally, it is determined by means of the synchronization unit S in which sequence the ultrasonic transmitters S1, S2 transmit.

As specified above, the distance between a reference point and a point to be selected or volume to be selected is set with the small wheel 39a.

So that an interference-free operation with the pointer wand 13 is possible around the 3D display, more than three ultrasonic receivers E1, E2, E3, En are used to prevent shielding effects by the 3D monitor.

Figure 7:
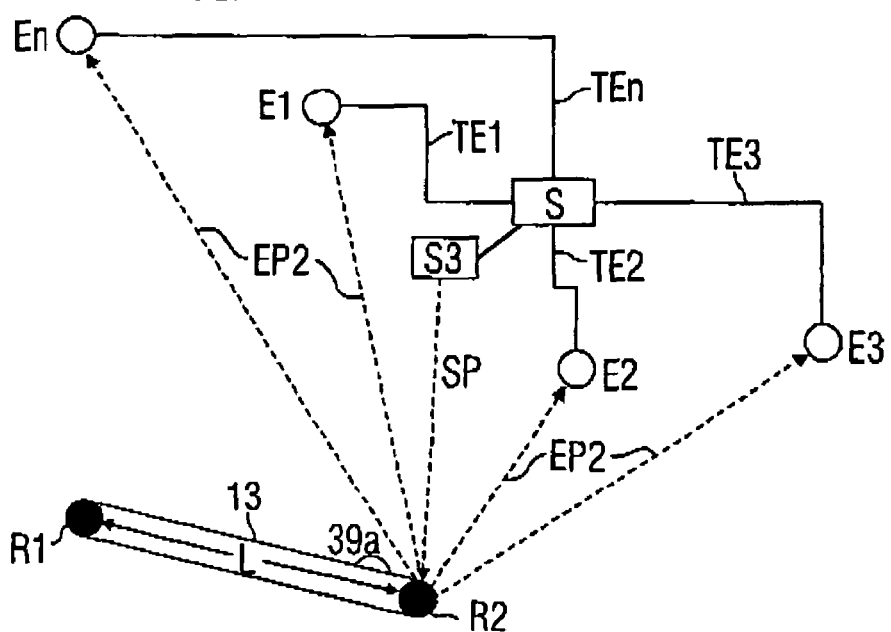
FIG. 7 is a second measurement arrangement that allows the determination of the position and arrangement of a pointer wand.

FIG. 7 clarifies a second measurement method with which, with the aid of ultrasonic reflectors R1, R2 in the pointer wand 13, the position and orientation of the pointer wand 13 can be determined with regard to the display volume 8. An ultrasonic pulse sequence is emitted by means of an ultrasonic transmitter S3. The ultrasonic pulse sequence comprises a series of short pulses with respectively set amplitudes and frequencies. The pulses are reflected on the reflectors R1 and R2 and subsequently registered by the receivers E1, E2, E3, En. The transmitter S3 and the receiver E1, E2, E3, En are again synchronized via a synchronization unit S. Both reflectors R1, R2 are arranged at the ends of the pointer wand 13 at the distance L, like the transmitters S1, S2 in FIG. 6.

The reflectors have the property that they are differently resonant at the various frequencies in the ultrasonic pulse sequence, meaning they reflect the ultrasonic pulses at different strengths. In this manner, the ultrasonic pulses are coded by the reflectors R1 and R2, such that, on the one hand, they can be differentiated by the receivers E1, E2, E3, En from one another, and on the other they can be differentiated from the reflections on foreign bodies. The distances between the reflectors and the receivers can again be calculated from the elapsed times, such that the position and orientation of the pointer wand 13 can be calculated with regard to the display volume 8 with the aid of the calculation unit 21.

Figure 8:
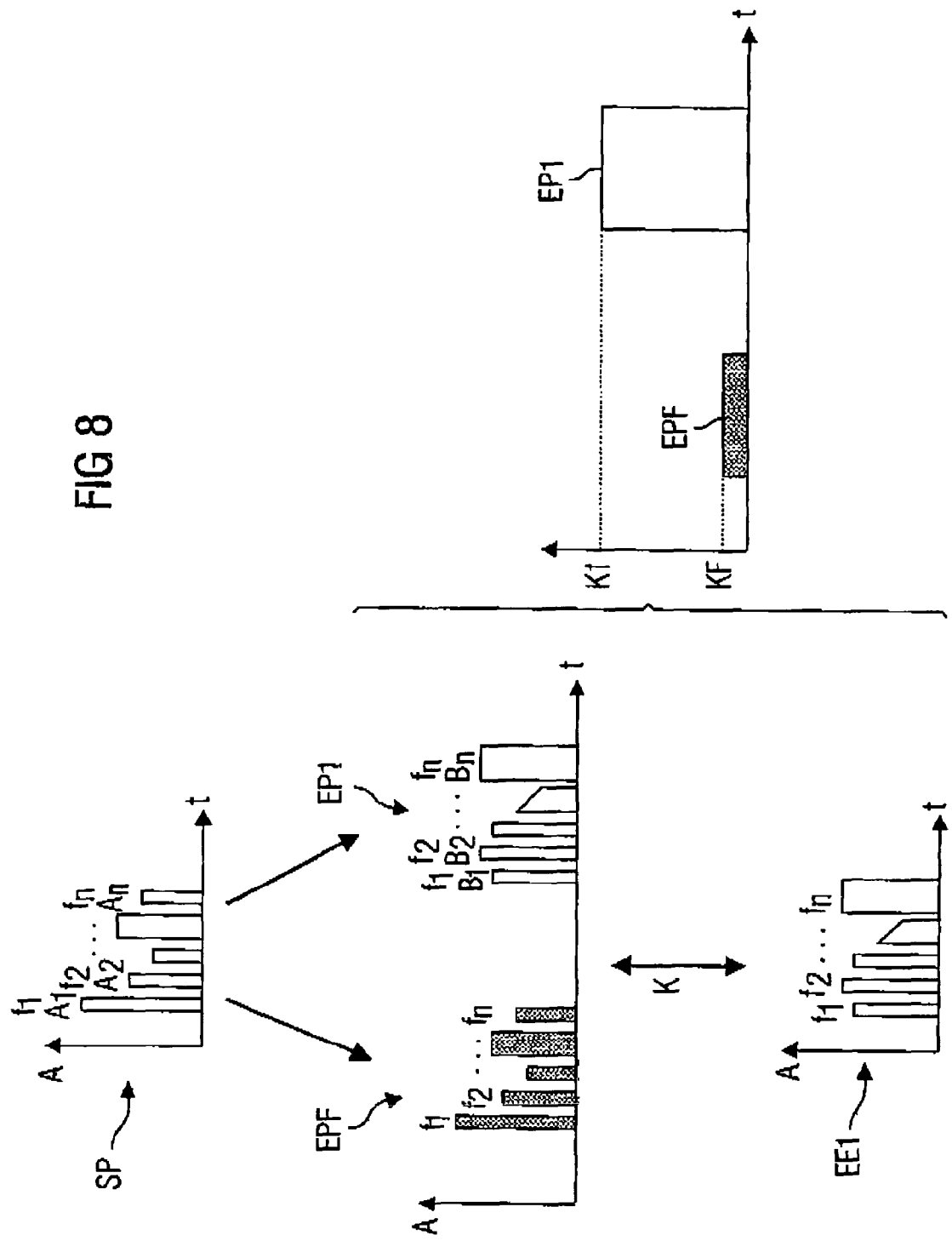
FIG. 8 is a drawing to clarify the coded reflection used in FIG. 7.

FIG. 8 clarifies the function of the coded reflection in the example of the reflections on the reflector R1 and on a foreign object. In the coding, the individual pulses of a signal transmission pulse sequence SP (whose curve of the amplitudes A1, A2, ... An at the frequencies f1, f2, ... fn over time t is schematically shown in FIG. 8) are respectively reflected with a defined reflection factor on the reflector R1. This generates a reflected echo signal pulse sequence EP1 with the amplitudes B1, B2, ... Bn. The pulse widths and pulse forms of the reception pulse sequence EP1 can thereby be characteristically modified by the reflection of the transmission pulse SP on R1. The reflection on a foreign object is uncontrollable and generates in turn an echo signal pulse sequence EPF, whereby the amplitude curve as an example in FIG. 8 was barely changed by the reflection on the foreign object. The amplitude curves of the echo signal pulse sequence EP1 and of the echo signal pulse sequence EPF over time t are likewise shown in FIG. 8.

Dependent on the reflector, reflected echo signal pulse sequences have different amplitude curves and pulse forms that are determined idealized by reflector-specific echo signals, for example by the echo signal EE1 shown in FIG. 8. With the aid of a correlation K of received signal and reflector-specific expected echo signals EE1, an association of the signal to the reflectors R1, R2 or to foreign objects can be implemented. If the received signal comprises, for example, the echo signal pulse sequence EP1, a correlation value K1 is obtained given the correlation K with the echo signal EE1. This is larger than the correlation value KF that was obtained given the correlation K of the echo signal pulse sequence EPF reflected on the foreign object with the echo signal EE1. If the echo signal pulse sequence EP1 and the echo signal pulse sequence EPF are received successively, the correlation of received signal and echo signal EE1 results in the time curve shown in FIG. 8.

For the calculation of the spatial positions of the reflectors R1, R2, the elapsed times of the corresponding pulse sequences are measured from the point in time of the transmission to the reception by E1, E2, ... En. Rotation ellipsoids with the focal points S3, E1, E2. E3, En are calculated from the elapsed times. The intersection point from at least three ellipsoids marks the positions of the reflectors R1, R2. To improve the precision of the position determination, the known distance L of the reflectors R1, R2 can be included in the calculation. Additionally, the resonance frequencies of the reflectors R1, R2 can be differentiated.

A display device 1 to display a visualization of three-dimensional data sets allows, for example, a plurality of representations and corresponding applications in medical representation of three-dimensional data, and especially in radiological representation of three-dimensional data. Given real 3D monitors, such a display device for simulation and training of operations can be directly implemented with the aid of virtual operation instruments. The data of the simulated operation can also subsequently be relayed to an operations robot.

In a first representation, it should be possible (with the aid of the input devices 11, 13) to probe into an opaque 3D subject, whereby the 3D subject is transparent in the vicinity of the arrow. The volume to be examined at the tip of the pointer should thus be made visible from the outside. The shape and size of the transparent volume can, for example, be adjusted on a cone shape. Alternatively, the arrow itself can be shown transparent, so that it does not cover the regions of the displayed subject.

In a variation of this representation, with the aid of the arrow an arbitrarily-shaped transparent volume (for example sphere or cube) is placed in the 3D subject. The position and orientation of the volume relative to the arrow is likewise adjustable. For example, the volume can be indicated by a virtual frame or cage in the display region 8 and moved and positioned through the 3D subject with the input device 11, 13. The 3D subject, for example, can thereby be shown transparent on a side of the frame.

A further possibility to define such a volume is that, with the input device 11, 13, a plurality of points are marked that together span the volume or a sub-region of the volume, for example a surface.

In a representation, the data points are shown within the volume, for example transparent.

In this manner, for example, an active processing of the data is possible such as, for example, an excision of interfering bones in the imaging.

Figure 9:
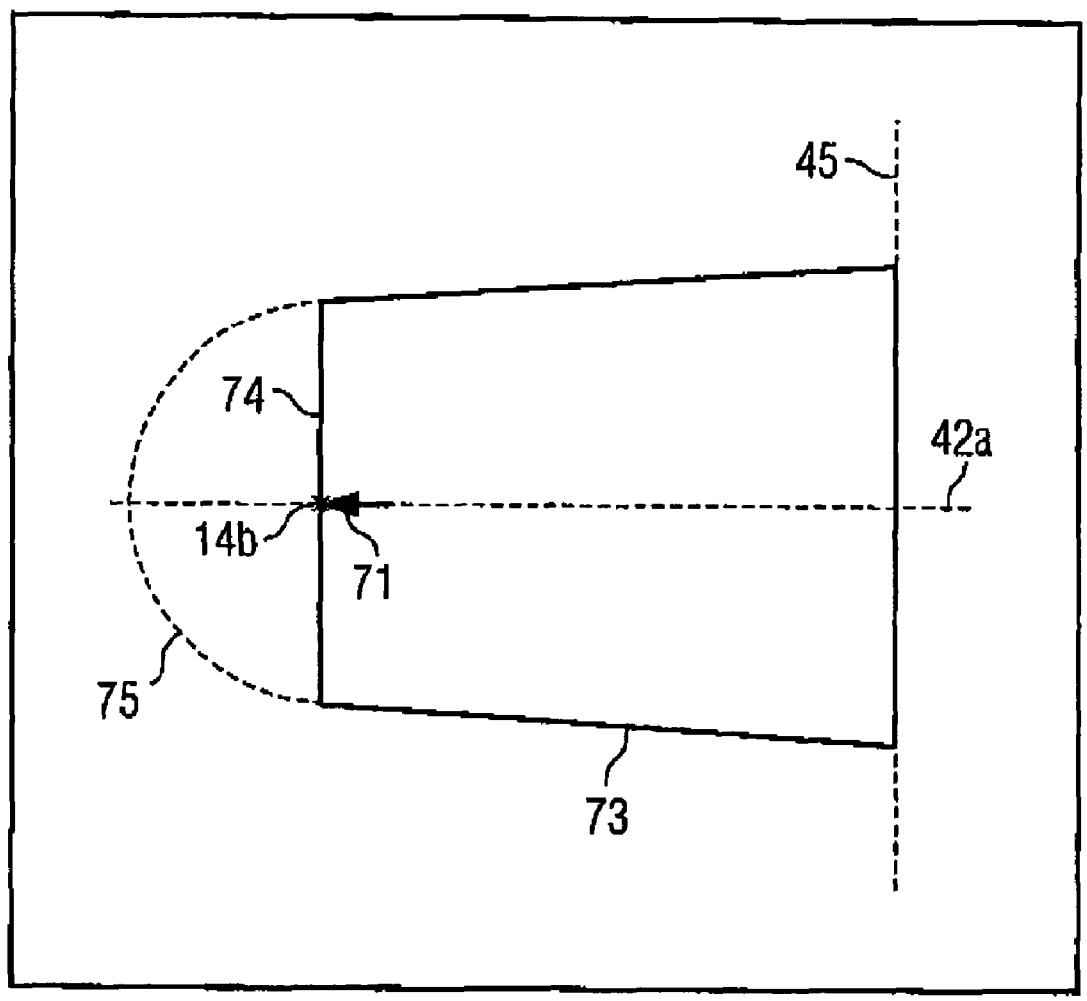
FIG. 9. are schematic slice representations of maniputable volumes.

Advantageous embodiments of, for example, the transparent switchable volume are represented in section in FIG. 9. In order to be able to consider the volume in the region of the arrow tip 71 along the straight line 42a, the volume can be designed in the shape of a cone 73. The end of the cone 73 in the region of the arrow tip, meaning the selected point 14b, is, for example, either shaped as a plane 74 or as a hemisphere 75.

Figure 10:
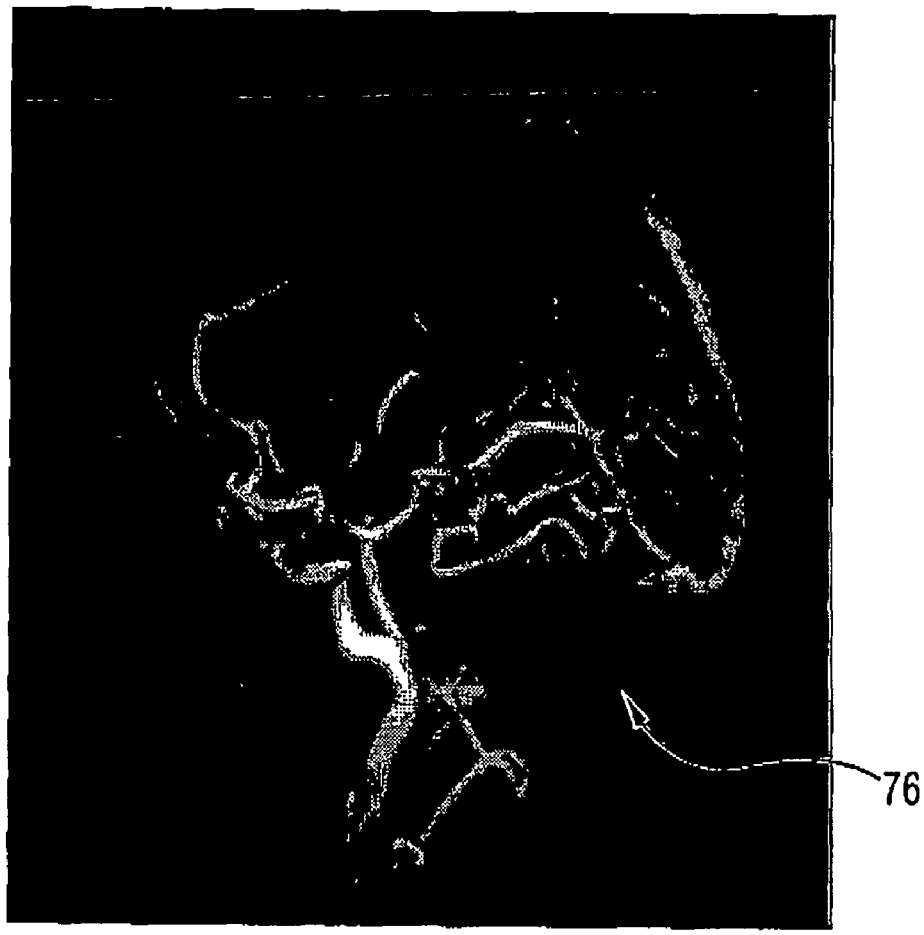
FIG. 10 is a 3D angiography exposure of a magnetic resonance tomography device.
Figure 11:
FIG. 11 is a 3D image of a knee joint of a computer tomography device.

A further representation is that of the grid or lattice representation 76. For clarification, FIG. 10 shows a 3D angiography exposure with a magnetic resonance tomography device, and FIG. 11 shows a 3D image of a knee joint with a computer tomography device. The data sets required for a grid representation can be generated via windowing, for example.

Figure 12:
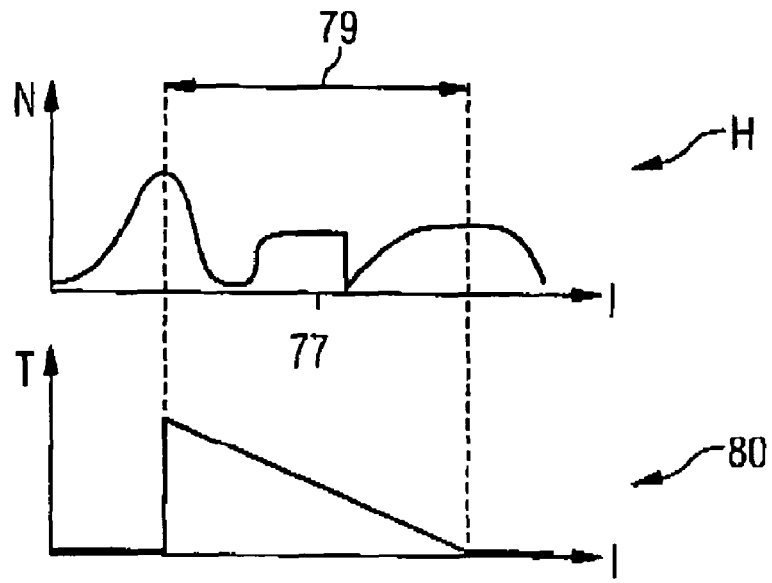
FIG. 12 is an intensity frequency distribution of data points as well as their degree of transparency distribution, set by means of windowing.

In a simple version of the windowing, only data points with similar intensity I are shown. For this, in a frequency distribution H the number N of the data points is recorded or entered with an intensity I (see FIG. 12). In addition to the intensity I, a frequency distribution H of another characteristic value such as, for example, flux or diffusion can also be selected. In the frequency distribution H, a median value 77 and a window width 79 around the median value 77 are selected. The data points that lie outside of the thusly defined window are, for example, shown transparent. The data points within the value range are particularly processed with regard to their representation, for example their degree of transparency T decreases linearly with increasing intensity (transparency degree representation 80). This causes in the representation that a point with a high intensity value I does not allow to show through data points that are located behind this point in the direction of observation.

The transparency of the 3D subject can be steplessly adjusted for all intensity value regions via the variation of the window parameters The procedure of the windowing enables it to select an arbitrary point on, for example, the intensity scale of an exposure, and to represent this as modified, for example as transparent or opaque.

In a first clarification of this procedure, a 3D subject is marked at a representative location. Subsequently, all data points with the same or at least a similar intensity are switched to transparent. This enables the observer (for example a radiologist) to switch to transparent data points that are not relevant to the examination, for example for suppression of light fatty tissue in a magnetic resonance exposure.

In a second clarification of this procedure, the data points are imaged as opaque that, starting from the representative location, comprise a continuous intensity curve. This results in a grid representation that approximates the 3D angiography exposure in FIG. 10. In contrast to this, if the thus selected regions are switched to transparent, it approximates an excision (for example, of bones) from regions obstructing the view.

Figure 13:
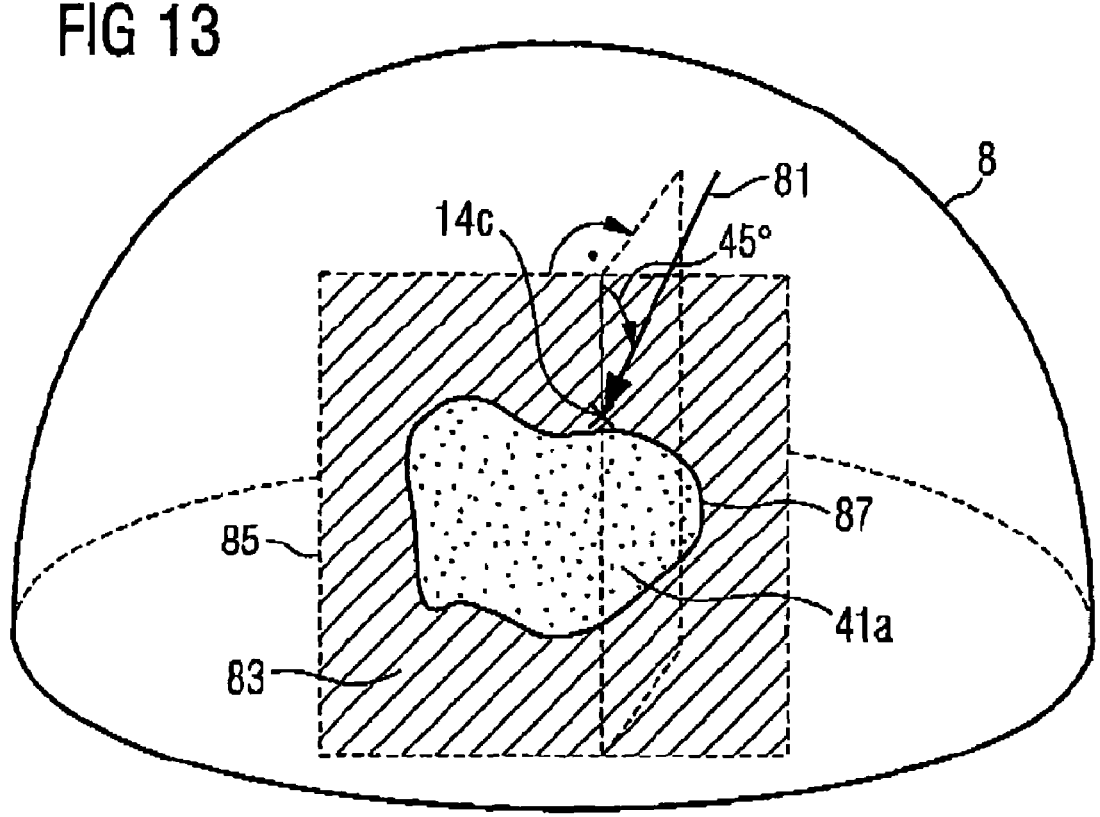
FIG. 13 is a drawing to clarify the selection of a slice in the representation space.

With the aid of the display device, it is likewise possible to select slices in the representation space 8. FIG. 13 shows a clarification of the procedure. A 3D subject 41a is located in the representation space 8. Additionally, an arrow 81 is shown that points to a selected point 14c. The slice plane 83 to be selected is sloped, for example by 45°, in relation to the plane that is orthogonal to the arrow 81, and is clarified via a frame 85 and a contour line plotted on the 3D subject 41a. The selected slice plane 83 can either subsequently be indicated along with the 3D monitor or it can be simultaneously imaged on the 2D monitor in the event that the 3D monitor is used together with a 2D monitor.

In many cases it is preferable to fix the arrow point at an arbitrary spatial point by means of the buttons of the input device 11, 13, and to subsequently vary, for example, the arrow direction of the angle of the selected slice with regard to the arrow 81.

Figure 14:
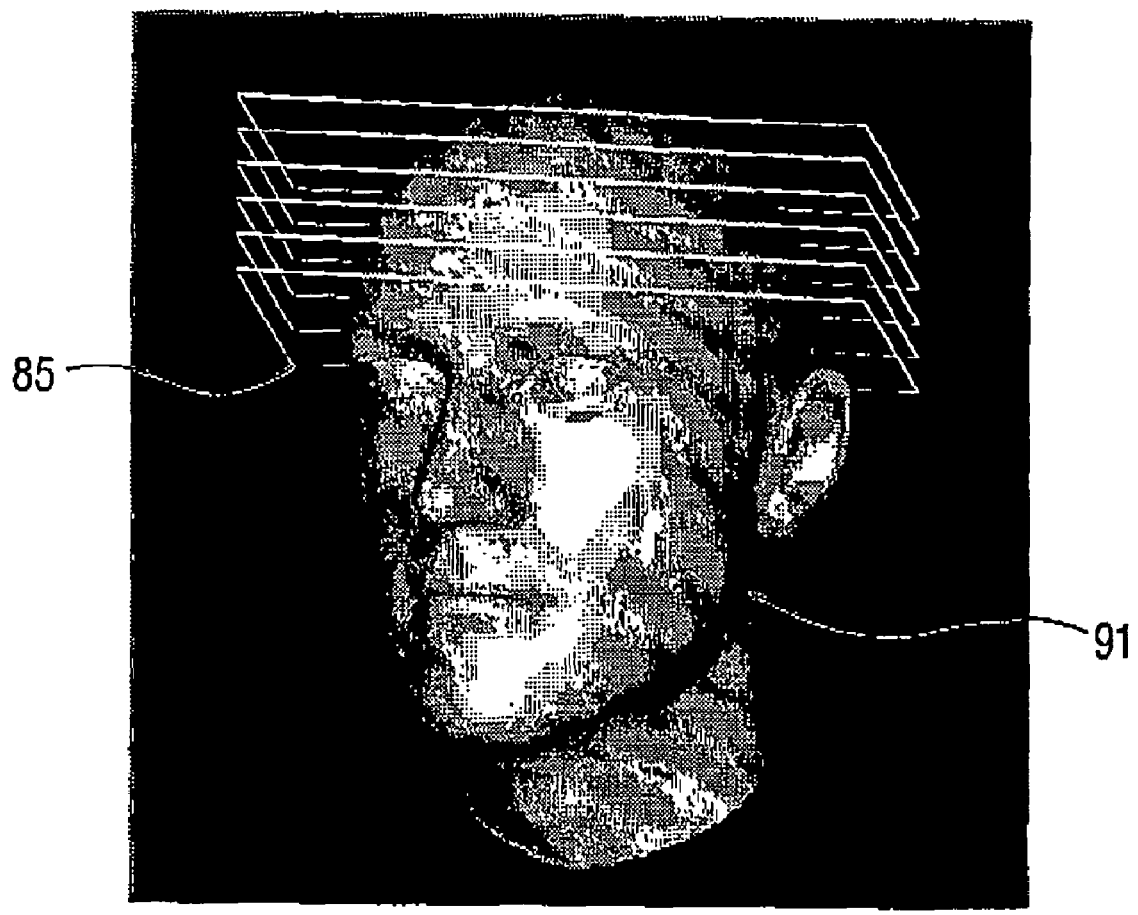
FIG. 14 is an image to clarify the positioning of slices in magnetic resonance tomography.

A possible application is graphical slice positioning in magnetic resonance tomography in which a fast 3D measurement is implemented for preparation. The acquired 3D data set comprises the body region to be examined at lower resolution and is shown with a 3D monitor. FIG. 14 shows an example. The user can realistically orient and position the next slice to be measured 83 (characterized by the frame 85) in the 3D subject, here the head image 91.

While preferred embodiments have been illustrated and described in detail in the drawings and foregoing description, the same are to be considered as illustrative and not restrictive in character, it being understood that only the preferred embodiments have been shown and described and that all changes and modifications that come within the spirit of the invention both now or in the future are desired to be protected.

I claim as my invention:

1. An input system for selecting a point by a user in a 3D volumetric visualization image of a three-dimensional data set, comprising:
    a volumetric 3D monitor which shows the 3D volumetric visualization image of said three-dimensional data set in 3D space surrounded by an associated surface or surfaces outwardly spaced from said 3D volumetric 3D space visualization image on which a reference point is definable with respect to said 3D visualization image shown by the monitor;
    a selection unit to select said reference point on the surface or surfaces relative to the 3D volumetric visualization image on the volumetric 3D monitor of the three-dimensional data set selected by the user, a direction unit to specify a direction from said reference point to said point being selected by the user in the 3D volumetric visualization image on the volumetric 3D monitor, and a distance unit to set a distance value from said reference point along said direction to said point being selected in the visualization image.

2. A system of claim 1 wherein said surface or surfaces is or are virtual.

3. The input system according to claim 1 wherein the selection unit comprises a positioning unit to position the reference point on the surface or surfaces, and a sensor registering a position of the reference point on the surface or surfaces.

4. The input system according to claim 1 wherein the selection unit comprises a mouse, and a movement of the mouse registered by the mouse corresponding to a movement of the reference point on the surface or surfaces.

5. The input system according to claim 1 wherein the direction unit comprises a level tiltable in a direction, and a sensor registering a tilting of the level in the direction.

6. The input system according to claim 1 wherein the direction unit comprises a joystick tiltable in two directions, tilting of the joystick unambiguously specifying two angles for direction specification.

7. The input system according to claim 6 wherein the joystick is structurally connected with a mouse.

8. The input system according to claim 1 wherein the selection unit and the direction unit comprise a pointer wand, and at least one of position and orientation of the pointer wand specifies respectively at least one of the reference point and the direction with respect to the visualization.

9. The input system according to claim 8 wherein at least one of the position and orientation of the pointer wand is measurable by means of ultrasonic elapsed-time measurements.

10. The input system according to claim 9 wherein the pointer wand comprises at least two ultrasonic transmitters, and the input system additionally comprises a receiving unit to receive ultrasonic signals and a synchronization unit to synchronize the ultrasonic transmitters and the receiving unit.

11. The input system according to claim 10 wherein the synchronization unit is connected by a radio connection with the ultrasonic transmitters of the pointer wand.

12. The input system according to claim 11 wherein the input system also comprises a button to actuate a signal.

13. The input system according to claim 9 wherein the pointer wand comprises at least two ultrasonic reflectors, and the input system additionally comprises an ultrasonic transmitter, a receiving unit to receive ultrasonic signals, and a synchronization unit to synchronize an ultrasonic transmitter and a receiving unit.

14. The input system according to claim 13 wherein the ultrasonic reflectors are designed such that they reflect an ultrasonic pulse with at least one of different strength and with characteristic pulse form, depending on a frequency of the ultrasonic pulse.

15. The input system according to claim 1 wherein the distance unit comprises a rotatable small wheel and a sensor to detect rotation.

16. The input system according to claim 1 wherein the input system also comprises an output unit to output a signal that comprises preferred information about at least one of the reference point, the direction and the distance value.

* * * * *